United States Patent [19]

Boone

[11] 4,232,138

[45] Nov. 4, 1980

[54] OLEFIN POLYMERIZATION CATALYST

[75] Inventor: David E. Boone, Lisle, Ill.

[73] Assignee: Standard Oil Company (Indiana), Chicago, Ill.

[21] Appl. No.: 861,869

[22] Filed: Dec. 19, 1977

Related U.S. Application Data

[63] Continuation of Ser. No. 751,441, Dec. 16, 1976, abandoned.

[51] Int. Cl.$^3$ .......................... C08F 4/02; C08F 10/02
[52] U.S. Cl. ............................. 526/122; 252/429 C; 252/441; 252/442; 526/124; 526/352
[58] Field of Search ................... 252/429 C, 441, 442; 526/122, 124

[56] References Cited

U.S. PATENT DOCUMENTS

| | | | |
|---|---|---|---|
| 3,042,626 | 7/1962 | Bruce et al. .......................... | 526/122 |
| 3,642,760 | 2/1972 | Baekelmans et al. ................ | 526/122 |
| 3,658,722 | 4/1972 | Delboulle et al. .................... | 526/124 |
| 3,819,599 | 6/1974 | Fotis et al. ........................... | 526/124 |
| 3,901,863 | 8/1975 | Berger et al. ........................ | 526/114 |
| 4,115,319 | 9/1978 | Siata et al. ........................... | 526/128 |
| 4,144,390 | 3/1979 | Denoitte et al. ..................... | 526/124 |

FOREIGN PATENT DOCUMENTS

| | | | |
|---|---|---|---|
| 2111455 | 9/1972 | Fed. Rep. of Germany ........... | 526/122 |
| 7113010 | 4/1972 | Netherlands ............................. | 526/124 |

*Primary Examiner*—Edward J. Smith
*Attorney, Agent, or Firm*—David E. Boone; William T. McClain; William H. Magidson

[57] ABSTRACT

A high activity catalyst component, useful in polymerizing ethylene and mixtures of ethylene and terminal olefins having eight or fewer carbon atoms, is prepared by reacting a Group II metal hydroxide with antimony pentachloride followed by reactions with a Group IVB or VB transition metal compound and an aluminum halide.

10 Claims, No Drawings

OLEFIN POLYMERIZATION CATALYST

This is a continuation, of application Ser. No. 751,441, filed Dec. 16, 1976, now abandoned.

BACKGROUND OF THE INVENTION

This invention relates to alpha-olefin polymerization catalysts and particularly relates to catalyst systems which are highly active.

The polymerization of alpha-olefins to normally solid, substantially crystalline polymers using hydrocarbon soluble catalysts comprising transition metal compounds and Group II-III metal organic compounds now is well-known in the art. Supporting such transition metal compounds on a Group II metal hydroxide also is known. For example, British Pat. Nos. 1,208,242 and 1,255,575, and U.S. Pat. No. 3,900,454, all incorporated by reference herein, disclose an olefin polymerization catalyst formed by calcining a trivalent metal halide, such as aluminum chloride, with a Group IIA, IIB, and VIIB hydrous oxide, such as magnesium hydroxide, followed by the addition of a Group IVB or VB hydroxide or alkoxide, transition metal halide, such as titanium tetrachloride. However, there is a continuing need in the industry for improved catalyst systems which produce a high yield of polymer as measured by the grams of crystalline product per gram of transition metal compound consumed.

SUMMARY OF THE INVENTION

This invention comprises forming an active alpha-olefin polymerization catalyst component by reacting the product of a Group II metal oxide or hydroxide and antimony pentachloride with a Group IVB or VB transition metal compound and an aluminum halide

BRIEF DESCRIPTION OF THE INVENTION

This invention discloses a catalyst system generally exhibiting a higher activity than the catalysts described in the above-cited references. In this invention, an olefin polymerization catalyst component is formed at relatively low temperatures from a Group II metal oxide or hydroxide, antimony pentachloride, an aluminum halide, and a transition metal compound.

In this invention, generally, the component for a high activity olefin polymerization catalyst is prepared by reacting the Group II metal oxide or hydroxide with antimony pentachloride either without solvent or in a suitable aromatic or aliphatic hydrocarbon at about 20° to 130° C. for 5 to 100 hours. Preferably, the reaction takes place in benzene at about 60° to 110° C. for about 10 to 24 hours. The Group II metal compound can be calcium hydroxide, a magnesium oxide or, preferably, magnesium hydroxide. To such hydroxide-antimony pentachloride composition, either (a) a Group IVB or VB transition metal compound is added followed by an aluminum halide or (b) an aluminum halide is reacted followed by the transition metal compound. The aluminum halide can be aluminum tribromide and preferably is aluminum trichloride.

Typically, according to procedure (a), the Group II metal hydroxide-antimony pentachloride composition is reacted with the transition metal compound for about 1 to 100 hours at about 20° to 130° C., either without solvent or in a suitable aliphatic or aromatic solvent. Preferably, the solvent is benzene, the reaction time is about 3 to 24 hours and the temperature is about 60° to 100° C. Aluminum halide then is added to the resulting mixture and reacted for about 3 to 100 hours at about 20° to 130° C. Preferably, the temperature is about 60° to 110° C. and the reaction time is about 3 to 100 hours. Usually, the same solvent is used for both the transition metal compound and aluminum chloride reactions. Similarly, according to procedure (b), aluminum halide can be reacted with the Group II metal hydroxide-antimony pentachloride composition before the transition metal compound reaction. The reaction conditions are the same as those described in procedure (a). Procedure (b) is preferred if the transition metal compound is alkoxide, alkoxyhalide or aryloxyhalide.

The molar ratio of antimony pentachloride to Group II metal oxide or hydroxide useful in this invention ranges from about 1:10 to about 5:1, typically is between about 1:2 to about 2:1, and preferably is about 1:1.

The molar ratio of transition metal compound to oxide or hydroxide can vary from about 1:30 to about 5:1, preferably about 1:15 to about 2:1, and most preferably about 1:5 to 1:1. The molar ratio of aluminum trihalide to oxide or hydroxide can vary from about 1:10 to about 10:1, preferably about 1:5 to about 5:1, and most preferably from about 1:2 to about 2:1.

Suitable transition metal compounds are halides, oxyhalides, alkyloxyhalides, aryloxyhalides, alkoxides, or aryloxides of a Group IVB or VB transition metal, preferably vanadium or zirconium, and most preferably titanium. Preferable compounds include titanium tetrachloride, titanium tetrabromide, butoxytitanium trichloride, dibutoxytitanium dichloride, tetrabutyl titanate vanadium tetrachloride and zirconium tetrachloride.

The final reaction product is washed with a dry hydrocarbon solvent, such as hexane, to remove unreacted transition metal compound. The resulting transition metal containing catalyst component is used with a Group II or III organometallic promoter in an olefin polymerization system. The ratio of grams of transition metal containing component to millimols of Group II-III organometallic range from about 1:2 to about 1:100 and typically is about 1:25. The amount of catalyst in a polymerization system depends on the reactor size, type, and the amount and type of olefin monomer, and is known to the skilled artisan.

Useful Group II-III organo metallics include trialkylaluminum, dialkylaluminum halides and mixtures thereof. Useful alkyl radicals contain from two to about six carbon atoms and useful halides are chloride and bromide. The preferable alkyl is ethyl and the preferable halide is chloride. The Group II-III metal typically is aluminum or magnesium. The preferable organo metallic is trialkyl aluminum and most preferably triethylaluminum. Other especially useful compounds include tripropyl aluminum, tributyl aluminum, triethyl aluminumdiethyl aluminum chloride mixture and a 6:1 mixture of diethyl magnesium and triethyl aluminum.

This invention can be used in slurry, solution, or solventless polymerization systems known to the art. In a slurry or solution system, polymerization occurs in an inert hydrocarbon solvent such as an aliphatic alkane at pressures ranging from atmospheric to about 5,000 psig, preferably from about 30 to 1000 psig, in a batch or a continuous process. A typical solventless system in which olefin is polymerized from the vapor phase is described in U.S. Pat. Nos. 3,957,448, 3,965,083, 3,970,611, and 3,971,768, all incorporated by reference herein.

In a slurry process, typically, the polymerization temperature is regulated such that polymer is formed as a solid in the reactor, and preferably is in the range of about 40° C. to 110° C. In a solution process, polymer is formed in solution at a temperature of about 130° to 250° C. and preferably about 150° to 200° C. In a solventless process, the preferred temperature range is from about 40° C. to about 130° C. and most preferably is about 60° C. to 120° C.

The polymerization time depends on the process utilized. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvent used in the slurry or solution polymerization technique including aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, toluene or xylene; or a haloaromatic compound such as chlorobenzene, chloronaphthalene or o-dichlorobenzene. Other suitable solvents include ethylbenzene, isopropylbenzene, ethyltoluene, n-propylbenzene, diethylbenzenes, mono-and dialkylnaphthalenes, n-pentane, n-octane, isooctane and methyl cyclohexane. Preferably, liquid hydrocarbons are used; most preferably in slurry polymerization, hexane is the polymerization medium. In solution polymerization, a higher boiling solvent is preferred such as a C-12 hydrocarbon. Although the nature of the solvent can be varied considerably, the solvent should be liquid under the reaction condition and should be relatively inert. Advantageously, the solvent used can be purified prior to use by distillation or by reaction with an aluminum alkyl to remove impurities.

The olefin polymers which can be made using the catalyst of this invention include normally solid, substantially crystalline polymers of ethylene and copolymers of ethylene with up to about 20 mol percent of a terminal olefin having 8 or fewer carbon atoms including alpha-olefins and dienes. This invention is most useful in polymerizing either ethylene or a mixture of ethylene with a minor amount of propylene. Such polymers have weight average molecular weights ranging from about 10,000 to 1,000,000 and higher and typically range from about 15,000 to 500,000. The molecular weight can be controlled by methods known to the art such as by the use of hydrogen.

The olefin monomers should be substantially free of catalyst poisons such as water, oxygen, carbon dioxide and polar organic compounds. Preferably, the olefin is passed through a molecular sieve prior to polymerization.

Since the catalyst systems used in this invention are sensitive to oxygen and moisture, suitable precautions should be taken during catalyst preparation, transfer and use.

This invention is demonstrated by, but not limited to, the following Examples.

Catalyst Preparation

Reagent grade magnesium hydroxide (5.8 g, 0.10 moles), dried benzene (45 ml) and antimony pentachloride (23.5 g, 0.0786 moles) were combined in a three-neck, 250-milliliter creased flask equipped with a condenser and a magnetic stirrer and attached to a nitrogen supply to maintain a positive nitrogen atmosphere. After heating at reflux for about 18 hours with stirring, the reaction mixture became viscous and 40 milliliters of benzene were added along with 3.0 milliliters (5.2 g) of titanium tetrachloride. After the mixture was heated at reflux with stirring for 20 hours, an additional 16 milliliters (27.7 g) of titanium tetrachloride were added. After heating at reflux for 24 more hours, 6.4 grams of aluminum chloride (0.048 moles) and 30 milliliters of benzene were added. The viscous mixture was heated at reflux with stirring for 6.5 hours before cooling under nitrogen. A portion of the resulting slurry was washed with hexane and used as an olefin polymerization catalyst.

EXAMPLES I–II

Into a 500-milliliter stirred autoclave were placed 66 milligrams of triethyl aluminum, 260 milliliters of n-hexane and a measured quantity of catalyst. Ethylene and hydrogen were introduced into the autoclave and maintained at 500 psig and 150 psig partial pressures, respectively. The reaction temperature was maintained at 180° F. for one hour after which the reaction was stopped and the resulting polymer was removed and washed with n-hexane. The results of a series of polymerization using different amounts of antimony-containing catalyst and using a comparison catalyst without antimony are shown in Table I.

TABLE I

| Example | (Run) | Catalyst (g) | Yield (g/g of Ti) | Melt Index (g/10 min.) |
|---|---|---|---|---|
| I | (1) | 1.0 | 39,000 | 0.60 |
| II | (1) | 1.9 | 27,800 | 0.71 |
| (A) | (2) | 3.3 | 21,200 | 0.55 |

(1) catalyst used as prepared above: SbCl$_5$ - Mg(OH)$_2$ - TiCl$_4$ - AlCl$_3$
(2) catalyst prepared without SbCl$_5$: Mg(OH)$_2$ - TiCl$_4$ - AlCl$_3$

EXAMPLES III–IV

A series of polymerization runs were performed in a one-liter stirred autoclave containing 500 milliliters of Isopar L solvent (a C-12 hydrocarbon), 44 milligrams of triethyl aluminum and a measured amount of catalyst, ethylene and hydrogen. These polymerizations were run at 325° F. for one hour. The results are shown in Table II.

TABLE II

| Example (Run) | | Catalyst (mg) | Ethylene (psig) | Hydrogen (psig) | Yield (g/g of Ti) | Melt Index (g/10 min.) |
|---|---|---|---|---|---|---|
| III | (1) | 6.0 | 950 | 50 | 13,000 | 4.0 |
| IV | (1) | 6.0 | 925 | 75 | 13,800 | 17.0 |
| (B) | (2) | 6.0 | 950 | 50 | 9,500 | 6.3 |

(1) using disclosed catalyst: SbCl$_5$ - Mg(OH)$_2$ - TiCl$_4$ - AlCl$_3$
(2) using catalyst without SbCl$_5$ - Mg(OH)$_2$ - TiCl$_4$ - AlCl$_3$ As is demonstrated by the examples, the catalyst prepared according to this invention using antimony pentachloride gives 30 to 85% increase in yield over a catalyst without the antimony constituent.

I claim:

1. A supported alpha-olefin polymerization catalyst component formed by (A) reacting magnesium hydroxide with antimony pentachloride in a molar ratio of about 10:1 to about 1:5 for about 5 to about 100 hours at about 20° to 130° C. and (B) reacting the resulting product (1) with a Group IVB or VB transition metal compound for about 1 to 100 hours at about 20° to 130° C., the molar ratio of said transition metal compound to said Group II metal compound being about 1:30 to about 5:1, and (2) with an aluminum trihalide selected from the group consisting of aluminum trichloride or aluminum tribromide for about 3 to 100 hours at about 20° to 130° C., the molar ratio of said aluminum trihalide to said magnesium hydroxide being about 1:10 to about 10:1.

2. The catalyst component of claim 1 wherein the transition metal compound is titanium tetrachloride, titanium tetrabromide, butoxytitanium trichloride, tetrabutyl titanate, dibutoxytitanium dichloride, vanadium tetrachloride or zirconium tetrachloride.

3. The catalyst component of claim 2 wherein the transition metal compound is titanium tetrachloride.

4. The catalyst component of claim 3 wherein the aluminum trihalide is aluminum trichloride.

5. The catalyst component of claim 1 wherein the transition metal compound is an alkoxide, alkoxyhalide or aryloxyhalide and reacted after the aluminum trihalide.

6. A supported alpha-olefin polymerization catalyst component formed by (A) reacting a Group II metal compound selected from the group consisting of magnesium hydroxide, magnesium oxide and calcium oxide with antimony pentachloride in a molar ratio of about 10:1 to about 1:5 for about 5 to about 100 hours at about 20° to 130° C. and (B) reacting the resulting product (1) with a Group IVB or VB transition metal compound for about 1 to 100 hours at about 20° to 130° C., the molar ratio of said transition metal compound to said Group II metal compound being about 1:30 to about 5:1, and (2) with an aluminum trihalide selected from the group consisting of aluminum trichloride or aluminum tribromide for about 3 to 100 hours at about 20° to 130° C., the molar ratio of said aluminum trihalide to said Group II compound being about 1:10 to about 10:1, wherein the transition metal compound is reacted before the aluminum trihalide.

7. In a process for polymerizing alpha-olefins thereof comprising contacting an alpha-olefin or mixtures thereof with a transition metal containing catalyst component with a Group II-III organometallic promoter, the improvement comprising using the transition metal containing catalyst component of claim 1.

8. In a process for polymerizing alpha-olefins comprising contacting an alpha-olefin or a mixture thereof with a transition metal containing catalyst component and a Group II-III organometallic promoter, the improvement comprising using the transition metal containing catalyst component of claim 2.

9. The process of claim 8 wherein the alpha-olefin is ethylene or a mixture of ethylene and a minor amount of propylene.

10. In a process for polymerizing ethylene comprising contacting ethylene with a transition metal containing catalyst component and a triethylaluminum promoter, the improvement comprising using the transition metal containing component of claim 4.

* * * * *

UNITED STATES PATENT OFFICE
CERTIFICATE OF CORRECTION

Patent No. 4,232,138           Dated November 4, 1980

Inventor(s) David E. Boone

It is certified that error appears in the above-identified patent and that said Letters Patent are hereby corrected as shown below:

| Patent Column | Line | |
|---|---|---|
| 1 | 36 | "aluminum halide" should be --aluminum halide,-- |
| 2 | 6-7 | "reactions. Sim-ilarly," should be --reactions. ¶ Similarly,-- |
| 2 | 45 | "II-III organo metallics" should be --organometallics-- |
| 2 | 52 | "organo metallic" should be --organometallic-- |
| 2 | 55-56 | "triethyl aluminumdiethyl aluminum" should be --triethyl aluminum-diethyl aluminum-- |
| 3 | 41 | "reaction condition" should be --reaction conditions-- |
| 4 | 63 | "without $SbCl_5 - Mg(OH)_2 - TiCl_4 - AlCl_3$" should be --without $SbCl_5 : Mg(OH)_2 - TiCl_4 - AlCl_3$ -- |

Signed and Sealed this

Thirty-first Day of March 1981

[SEAL]

Attest:

RENE D. TEGTMEYER

Attesting Officer     Acting Commissioner of Patents and Trademarks